US009652920B2

(12) United States Patent
Chen (10) Patent No.: US 9,652,920 B2
(45) Date of Patent: May 16, 2017

(54) VOTING SYSTEMS AND VOTING METHODS BASED ON SMART MOBILE COMMUNICATION DEVICES

(71) Applicant: ZhuHai Zaizhou Software Technology Co., Ltd., Zhuhai (CN)

(72) Inventor: Lihao Chen, Zhuhai (CN)

(73) Assignee: Zhuhai Zaizhou Software Technology Co., Ltd. (CN)

( * ) Notice: Subject to any disclaimer, the term of this patent is extended or adjusted under 35 U.S.C. 154(b) by 373 days.

(21) Appl. No.: 13/788,019

(22) Filed: Mar. 7, 2013

(65) Prior Publication Data

US 2014/0089062 A1    Mar. 27, 2014

(30) Foreign Application Priority Data

Jun. 21, 2012    (CN) .......................... 2012 1 0209301

(51) Int. Cl.
G07C 13/00    (2006.01)
(52) U.S. Cl.
CPC .................................. *G07C 13/00* (2013.01)
(58) Field of Classification Search
CPC ...... G07C 13/00; G06Q 50/34; G07F 17/3288
USPC ......................................................... 705/12
See application file for complete search history.

(56) References Cited

U.S. PATENT DOCUMENTS

| | | | | |
|---|---|---|---|---|
| 6,081,793 A * | 6/2000 | Challener | .............. | G07C 13/00 |
| | | | | 235/386 |
| 7,237,717 B1 * | 7/2007 | Rao et al. | ...................... | 235/386 |
| 7,533,813 B2 * | 5/2009 | Knowles | ....................... | 235/386 |
| 8,887,987 B2 * | 11/2014 | Yee et al. | ........................ | 235/51 |
| 8,892,456 B2 * | 11/2014 | Vicari | .............. | 705/12 |
| 2011/0238463 A1 * | 9/2011 | Marchal | ......................... | 705/12 |
| 2013/0085815 A1 * | 4/2013 | Onischuk | .............. | G07C 13/00 |
| | | | | 705/12 |

* cited by examiner

*Primary Examiner* — Jagdish Patel
(74) *Attorney, Agent, or Firm* — Lerner, David, Littenberg, Krumholz & Mentlik, LLP (57) ABSTRACT

The invention provides a voting system based on smart mobile communication devices. It comprises at least one smart mobile communication device, at least one server device, a client module, and a server module. The client module is installed on the smart mobile communication device and it is used for temporarily saving the voter's information, submitting identity verification request, showing voting inquiries, and submitting votes. The server module is installed on the server device and it is used for storing the voter's information, verifying the voter's registration and identity, issuing and verifying the voting certificate, creating and publishing the voting affair, and calculating and publishing the voting contents statistics. The client module and the server module perform digital communications through a mobile communication network. The invention also provides a voting method based on smart mobile communication device. According to this invention, voting can be safe, convenient and fast.

11 Claims, 4 Drawing Sheets

VOTING SYSTEMS AND VOTING METHODS BASED ON SMART MOBILE COMMUNICATION DEVICES

CROSS-REFERENCE TO RELATED APPLICATION

The present application claims priority from Chinese Patent Application No. 201210209301.6 filed in the State Intellectual Property Office of China on Jun. 21, 2012, the entire content of which is hereby incorporated by reference herein.

FIELD OF THE INVENTION

The invention relates to a voting system. More particularly, the invention relates to a voting system which is based on a smart mobile communication device. The invention also provides a voting method which is based on a smart mobile communication device.

TECHNICAL BACKGROUND OF THE INVENTION

The smart mobile communication devices which can be used in this invention include the following three types: smart phones, a combination of a mobile phone having calling and text messaging capabilities and a tablet PC with the internet capabilities, a tablet PC with internet and phone capabilities. The mobile communications network used in the invention comprises a mobile internet. The mobile internet combines mobile communication with internet. The mobile internet has been through four generations, 1G, 2G, 3G, and 4G, while 4G is the current generation. The mobile internet standard includes GSM, CDMA, GPRS, CDMA2000, WCDMA, TD-SCDMA, TD-LTE, LTE, and Wi-Fi technology. The Wi-Fi, commonly known as wireless broadband, is a short range wireless transmission technology which helps users to access emails, websites, and the streaming media.

"Voting" means to collect information from the targeted crowd. In general, a formal, secured and creditable voting method has the following important features: secretiveness, completeness, truthfulness, uniqueness, legitimacy and verifiability. Secretiveness means that the voting contents are not made known to anyone except to the voter and assigned personnel (such as persons who count the votes). Completeness means that all valid votes are correctly counted. Truthfulness means that the vote truly reflects the voter's intent and cannot be altered by others. Uniqueness means that each vote is counted only once and no voter is allowed to cast more than one vote for the same voting matter. Legitimacy means that only a legitimate voter can participate in the voting. Verifiability means that the voter is able to verify whether the voter's vote is counted.

No matter whether the voting is a non-secret voting or secret voting, usually the voting takes place one site by paper, a voting device provided by the voting organization, or a special voting device or similar equipment. Although the on-site voting site may meet the uniqueness, legitimacy and other requirements, it is limited by the voting location and time; the voter has to go to the specific site assigned by the voting affair management organization at a given time to case the vote. Furthermore, the voting affair management organization has to assign employees to manage the voting. This is inconvenient and inefficient for voting and vote counting. It is impossible for the voters to cast votes or the voting employee to operate the voting remotely.

To solve the above problem, an electronic voting method based on internet has been used. This method overcomes the geographical limitation of the paper voting. However, the method cannot ensure voting uniqueness, secretiveness, and truthfulness and thus it is difficult to be implemented. For example, in order to meet the security requirement of the secret electronic voting, the information technology providers developed blind signature and ring signature strategies, homo-morphic encryption, hybrid network, zero-knowledge proof protocol, secured multiparty calculation, secret sharing and threshold cryptography, FOO protocol, and the its improved protocol. The FOO protocol is relatively commonly used. It is an electronic voting protocol suitable for large scale voting and is an electronic voting system based on an anonymous channel. It uses the Bit Commitment, blind signature and similar technologies and it relatively well resolved the issue of the anonymity requirement. However, the FOO protocol does not allow voters to abstain from voting. Furthermore, when two votes collide, i.e., the votes by two legitimate voters are identical, they may be mistakenly considered as a double voting. The FOO protocol strictly requires the voter to submit an encrypted key on time; otherwise, the voting contents will be released early or cannot be decrypted during the counting of the votes. None of the above protocol can ensure the security of the electronic secret voting. For electronic secret voting, its main focus is on the completeness and truthfulness of the voting contents, i.e., the voting contents by the voter reflect the voter's true intent and are not altered by anyone else. Currently, there is no electronic voting method which ensures this security. For the non-secret voting, the general requirements for the uniqueness, truthfulness, and security are greater because the voter's information is shown on the voting ticket. The method of internet electronic voting does not meet all these requirements. The use of internet for electronic voting method often cannot satisfy the above general requirements. Security is one of the most important features of a voting system; it ensures the fairness and justice. For the governmental or internal enterprise voting or voting for an important candidate, the requirement for security of the voting process and voting contents is even more important. The current voting methods cannot meet the security requirement. Furthermore, no matter whether the voting is a secret voting or non-secret voting, the internet-based electronic voting methods use desktop and laptop computers in order for the voting affair management organization to log into. They are not suitable for the voters who have no fixed working sites and cannot meet the need of the modern society for fast and convenient voting systems.

DESCRIPTION OF THE INVENTION

An objective of the invention is to provide a smart mobile communication device based voting system which meets the requirements for the important voting features and is quick and convenient for electronic voting.

To achieve the above objective, the smart mobile communication device based voting system of the invention comprises at least one smart mobile communication device, at least one server device4, a client module (51,52), and a server module (61,62). The client module (51,52) is installed on the smart mobile communication device and is used for temporarily saving the voter's information, submitting request for voter's identity verification, showing voting inquiries, and submitting votes. The server module (61,62)

is installed on the server device4 and it comprises a voter management module (71,72), a certificate management module (91,92), and a voting affair management module (81,82). The server module (61,62) is used for saving the voter's information, verifying the voter's registration and identity, creating voting certificate, verifying voting certificate, creating and publishing the voting affair, and calculating the statistics of the voting contents and publishing the results. The client module (51,52) and server module 6 perform digital communications through a mobile communication network3.

It can be seen from the above scheme that the invention uses the client module (51,52) to achieve the voter's identity verification request, to show voting inquiries, and to temporarily save voter's information such as the voting certificate, etc. The server module (61,62) is used to permanently save the voter's information, the voting affair and voting contents, verify the voter's registration and identity, create and publish the voting affair, and to calculate the statistics of the voting contents and publish the results. The server module (61,62) can also according to the voter's information create a voting certificate for the voter who passes the registration verification and identity verification and send the voting certificate to the client module (51,52). The voter can use the voting certificate to execute the digital signature for the voting affair and complete the voting procedure. Therefore, the voter may use a smart mobile communication device, i.e., a smart phone or a tablet PC with communication function, to vote from anywhere at any time. As the mobile communication network technology and related device which this invention involves become popular and readily available, such as iPhones and iPads, all kinds of android cellular phones or tablet devices, and the 3G mobile communication services become popular with many domestic telecommunication service providers, this invention breaks through the geographic limitation of the paper voting or internet voting of the existing technology. More importantly, in this invention, the voter is required to register the voter's information before voting to verify the voter's truthfulness and legitimacy. A voting certificate is created according to the voter's information, i.e., one person can only have one voting certificate. This guarantees the uniqueness of the vote, the truthfulness of the voting contents, and the secretiveness of the voting process, and truly secures the voting process. This invention fully utilizes various mobile network2 technologies and existing and successful encryption technologies and digital signature technologies. According to this invention, voting can be carried out safely, quickly, and conveniently.

Another objective of the invention is to provide a voting method based on mobile communication devices. The voting method is installing a client module (51,52) on a smart mobile communication device and installing a server module (61,62) on the server device4; the server module (61,62) comprises a voter management module (71,72), a certificate management module (91,92) and a voting affair management module (81,82); the client module (51,52) and the server module (61,62) perform digital communications through a mobile communication network3. An example of the voting method is as follows. Step 1: the server module (61,62) creates and publishes the voting affair. Step 2: the voter provides the voting information through the client module (51,52) to the server module (61,62). The server module (61,62) according to the voter's information through the voter management module (71,72) saves the voter's information, verifies the registration and identity. Step 3: the server module (61,62) create a voting certificate according to the voter's information after the registration verification and identity verification and sends it to the client module (51, 52). Step 4: after the voter executes the digital signature using the voting certificate through the client module (51, 52), the voting contents of the voting affair is submitted to the server module (61,62); the server module (61,62) calculates the statistics of the valid voting contents and publishes the results.

It can be seen from the above scheme that the invention uses the smart mobile communication device on the voting side and the voter through the voter management module (71,72) installed on the server device4 verifies the registration and identity, and thus verifies the truthfulness and legitimacy of the voter's identity; the voter who passes the verifications submits through the client module (51,52) the voting certificate creation request to the server device4, and uses the voting certificate to execute the digital signature for a given voting affair to accomplish the voting operation. Therefore, in the voting process, there are multiple security checks: when the voter is registered, the voter's registration and identity are verified to ensure that one person has only one voting certificate. The legitimacy of the voting certificate is again verified during the voting process. Thereby, the security, secretiveness, and uniqueness of the voting contents are guaranteed in the voting process. The voter can use a smart mobile communication device, such as a smart phone, a mobile phone having a calling and text messaging functions and a tablet PC having an internet function, and a tablet PC having internet and phone functions to quickly and conveniently perform the voting at any time and in any place. Compared with the current voting methods which use paper, voting device, or internet, the method of the invention is more convenient and faster in addition to the more secured for the voting contents and voting process. Therefore, the method of the invention combines the features of security, convenience and speed and it greatly enhances the voting efficiency.

DESCRIPTION OF THE CURRENT TECHNOLOGY USED IN THE INVENTION

Digital signature: it is also called public key, electronic stamp or electronic signature. It often exists in one of the following forms: existing within the digital information, as an appendix of the digital information, a digital form logically associated with the digital information, etc. It is used to tell the signatory's identity and indicate the signatory's acknowledgement of the information contained in the digital information. It is equivalent to a person's handwritten signature on paper; the only difference is that the public key encryption is used as a technology tool, especially, as a method for authenticating the digital information.

GUID is an abbreviation of Global Unique Identifier; it is also known as UUID, which is an abbreviation for Universally Unique Identifier. GUID is a digital identifying symbol having a binary length of 128 and is obtained through a particular computing method. It is used to identify the uniqueness of a product. GUID is primarily used in multiple nodes and multiple computers networks or systems in which the distribution must have a unique identifier. It must be assigned a unique identity. In the Windows platform, GUID is widely used in Microsoft's products; it is used to identify registry entries, class and interface ID, database, system directories, and other objects.

MD5 is the abbreviation for Message Digest Algorithm 5. MD5 is an algorithm that ensures that the information transmits with integrity. It is widely used as a collision algorithm and is also known as a digest algorithm or hash algorithm.

SHA is the abbreviation for Secure Hash Algorithm. It is a digital encryption algorithm. The algorithm has become increasingly sophisticated after many years of development and improvement. SHA is now recognized as the most secure hash algorithm and is widely used. The algorithm is based on the idea of receiving a plaintext, and then converting the plaintext to ciphertext irreversibly. It can be understood simply as a process of taking a string of input codes (referred to as pre-mapping or information) and transforming them into a shorter length, digit-fixed output sequence hash value (also known as message digest, or message authentication code). Hash values can be referred as "fingerprints" or "digests" of a plaintext; thus the digital signature of the hash value can be regarded as the digital signature of a plaintext.

The invention is further illustrated by the following diagrams and the examples.

EXAMPLES OF OPERATION

Voting System Example 1

Figure 1:
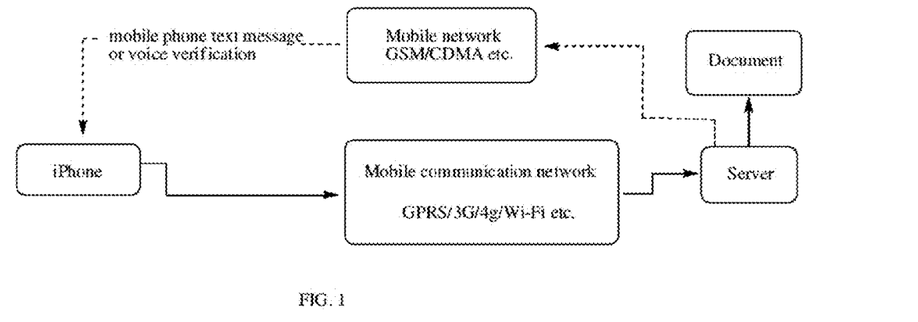
FIG. 1 is an illustrative diagram of the network connection of Voting System Example 1 of the invention.
Figure 2:
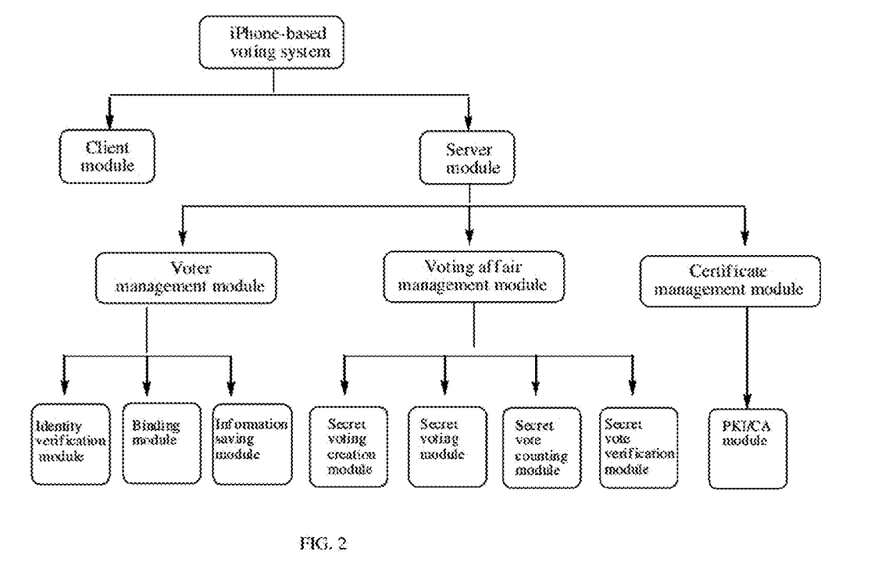
FIG. 2 is an illustrative functional structure of Voting System Example 1 of the invention.

See FIG. 1 and FIG. 2. This Example is a voting system based on iPhone 1 (Apple smart phone). It includes several iPhones, a server device4, a client module 51, and a server module 6. A client module 51 is installed on each of the iPhones and is used for temporarily storing the voter's information, submitting request for verifying voter's identity, showing voting inquiries, and submitting votes. The server module 61 is installed on the server device4. It comprises a voter management module 71, a certificate management module 91, and a voting affair management module 81; and it is used for storing the voter's information, verifying the voter's registration and identity, issuing and verifying the voting certificates, creating and publishing the voting affair, and calculating the statistics of the voting contents and publishing the results. The client module 51 and the server module 61 perform digital communications through a mobile communication network3 or a mobile network2, such as 4G, 3G, GPRS, Wi-Fi, GSM or CDMA. To simplify, the following is an example using only one iPhone1.

The voter management module 71 comprises an identity verification module 101, a binding module 111 and an information saving module 121. The identity verification module 101 is used to verify the voter's registration, i.e., it verifies whether the voter's information is correct, sends the results to the binding module 111, and verifies the voter identity. The binding module 111 is used to bind the verified voter one-to-one with the voter's iPhone number. The information saving module 121 is used to save the voter's information. The structured data of the voter's information includes: the User ID, log-in name and password, the voter's name, document type, identification number, and the binding phone number. The user ID is the only identification for the voter in the voting system and is automatically created by the voting system. The log-in name is the voter's name which is used to log-in the voting system, it does not allow repetition, and is inputted by the voter. The log-in password is the user's password which is used to log-in the voting system. The voter's name is the voter's Chinese or English name. The document type is the voter's identification document such as ID card, passport, and military officer certificate, etc. The document number is the number of the voter's identification document, such as the document number of the voter's ID card. The binding cell phone number is the voter's cell phone number used to recognize the iPhone1. The above structured data is the voter's information which the voter must provide when the voter logs on the voting system, i.e., the required information for the voter's registration. Other information, such as how to contact the voter, the voter's date of birth, place of birth, identity of the reviewers and reviewing procedure, etc., may be optional for the voter to fill out. For a formal voting or relatively important voting, the voter's information should be carefully verified. The verification procedure can be set up in the voting system. One or more verifiers can be successively used to review the voter's information.

The identity verification module 101 is used to verify whether the voter is eligible to vote and whether the voter's information submitted is correct; it then sends the verified results to the binding module 111. The binding module 111 binds the verified voter's information one-to-one with the voter's iPhone number. The identity verification module 101 continues to verify the voter's identity, i.e., it verifies whether the voter's information is legitimate and valid. It can go through a third party such as the public security office's query entry, and it can also go through preset legitimacy conditions. The method to verify a voter's identity may vary depending on the actual needs, such as on-site verification, i.e., when the voter who has a valid identification document goes to a voting center, and the voter can be registered by a relevant manager. It can also be done by remote network identity verification. In this example, the remote network identity verification is used.

The voting affair management module 81 comprises a secret voting affair creation module 131, a secret voting module 141, a secret vote counting module 151, and a secret vote verification module 161. The secret voting affair creation module 131 is used to create a secret voting affair, to publish the voting affair via digital signature, and to verify voter's eligibility to vote. The secret voting module 141 is used to execute the digital signature for the voter's voting contents by using voting certificate and to encrypt and submit the voting contents. The secret vote counting module 151 is used to decrypt the voting contents, to verify whether the decrypted voting contents and the voting process are legitimate, to calculate the statistics of the voting contents from a legitimate voting process and publish the results by the digital signature. The secret vote verification module 161 is used to verify the validity of the voting contents in accordance with the secret voting affair and the secret voting certificate. The structured data associated with the secret voting affair include the voting affair ID, title, voting time, voting condition, counting method, voting algorithm, electronic vote counting certificate, summary of the voting contents, detailed description of the voting contents, and voting matter table. The voting affair ID is a unique identifier for the voting affair in the voting system and is automatically generated by the voting system. The title is a brief description of the voting contents that is no more than 100 Chinese characters, e.g., "Photographic Association 2012, the first by-election standing committee." The voting time is the date and time for valid voting, e.g., "Feb. 1, 2012 to Feb. 3, 2012, 8:00-18:00." The voting condition is the voter's qualification condition. In this case, it is expressed by regular expression as "Voter: Member of the Photographic Association=yes." The counting method is the method to activate the counting function, including a real-time vote counting and a non-real-time vote counting. Real-time vote counting means counting the votes immediately after the voters cast the votes. Non-real-time vote counting means counting the votes after the valid voting period is over. Voting algorithm refers to the voting results and the vote calculation. In this Example, it is expressed by regular expression as "Most selected matters=2, passing voting rate>=50% and the first two having the highest number of votes." Electronic counting certificate refers to the secret voting certificate of the counting process; the counting process uses the public key of the secret voting certificate to encrypt the voting contents. Summary of the voting contents refers to a clear and brief writing in a limited number of words to summarize the voting affair. It is used to in a multi-line display of the voting affair; it may include graphics. Detailed description of the voting contents is a detailed explanation for the basis of the voting, the objectives, and the voting procedure etc. with no limit for the number of words and is used in the single-screen display of the voting affair; it may include graphics. Voting matter table refers to one or more voting matters, i.e., the voting contents by the voters, such as the names of the candidates etc. The key matters of the secret voting affair are discussed above. Additional selections can be added based on actual needs, e.g., whether a teller is needed and whether a notary is needed. A secret voting affair includes a voting matter table consisting of one or more voting matters lists. The voting matters are the selections which the voters are going to make. The core structured data of the voting matters include the voting matter ID, title, summary and detailed information. Voting matter ID is a unique identifier used in the voting system and automatically generated by the voting system. Title is a brief description of the voting matters with no more than 100 Chinese characters, e.g., the names of the candidates can be used as the title. Summary is an overview of the voting matter in a combination of language and graphics, e.g., a photo of the candidate and an introduction to the candidate's key accomplishments etc. Detailed information describes the voting matters in detail and in a combination of language and graphics. The above data are provided by the voting affair management organization and are filled out through the voting affair management module 81. After the data are filled out, the secret voting affair creation module 131 according to the structured data of the voting affair creates the binary document; after an electronic signature the voting affair management organization publishes the binary document. Then the voter may check the voting matters with an iPhone1 and select one or more voting matters to vote. The voting affair management organization, tellers, verifiers, and other staff involved in the voting process have been verified by a relevant verification organization for their eligibility and the legitimacy. Therefore, it has already had its own digital certificate for the digital signature. The secret voting affair creation module 131 is also used to verify whether the voter is qualified to vote for the secret voting affair.

The certificate management module 91 comprises a PKI/CA module 171; it is used to create the secret voting certificate by the secure framework of the PKI/CA module 171 and to verify the legitimacy of the secret voting certificate. The PKI/CA module 171 is a verification system which has been approved by the governments and supplied by legally certified service providers. PKI is the abbreviation for Public Key Infrastructure and refers to the basic infrastructure of the public key. CA is the abbreviation for Certificate Authority and refers to the certificate center. The working principle of PKI/CA is to establish a trusted network through issuing and maintaining the digital certificates. Users in the same trusted network use the digital certificate received to process identity verification and security check. Before the secret voting, the voter automatically creates a pair of asymmetric encryption keys on iPhone1, i.e., a public key and a private key. Through the client module 51, the voter sends the public key as a certificate request to the server device4 by 3G network. The certificate management module 91 of the server device4 receives the certificate request and then to the voter by either a voice or a text message according to the binding iPhone number in the voter management module 71 sends a valid first random verification code. After the certificate management module 91 verifies that the first random verification code is correct, it issues a secret voting certificate only to the voter for the voter to vote during the valid voting period. The voter uses the first random verification code as an anonymous way to download the secret voting certificate which the voter applied for. During the above process, when the secret voting certificate is issued to a voter, the voting affair management organization and the PKI/CA module 171 both use the blind signature policy. The secret voting certificate is also anonymously downloaded. Therefore, only the voter knows the relationship between the voter and the secret voting certificate.

The detailed voting process is as follows.

During the valid voting period, the voter selects a secret voting affair on iPhone1. The iPhone screen shows the current valid secret voting affair table for the voter to select. After the voter selects a secret voting affair, the iPhone screen shows the voting matters of the secret voting affair. After the voter selects a relevant voting matter, the client module 51 checks according to the conditions provided by the voting algorithm of the secret voting affair whether the current selection meets the requirements. If the current selection does not meet the requirements, the voter is asked to reselect. If a voter is only allowed to select one voting matter but selected two or more voting matters, the voter is asked to reselect. After the voter selects a voting matter by iPhone keyboard or screen, the voting operation is finished when the voter enters the corresponding private key. Due to secret voting, the voter does not need to log into the voting system with the voter's real name. The voter verifies the vote on iPhone1. After the valid voting period is over, the secret vote counting module 151 is automatically activated to proceed to the vote counting stage; the secret vote counting module 151 can also be manually activated to proceed to the vote counting stage. At this point, first the voter's voting contents is decrypted, and then the legitimacy of the secret voting certificate of the voting contents, the completeness of the voting contents, and the legitimacy of the voting process are verified. Finally, the statistics of the voting results is calculated and published. No matter what type of counting method is used, before the statistics of the secret voting contents is calculated, the secret vote counting module 151 in the voting affair management module 81 must perform the following operation: clearing the entire statistic results of the voting contents under the voting affair so that the initial counting operation can proceed.

The voter may use the secret voting certificate saved in the voter's iPhone1 to verify whether the voter's vote is included in the voting results and to check whether the voting contents are tampered with by any illegitimate person. The voter may manually delete the secret voting certificate on the voter's iPhone1 after the vote counting is completed and is verified correct. The above-mentioned vote verification function is a preferred way in this Example. If this Example omits the vote verification function, it can still achieve the objective of the invention.

Voting System Example 2

Figure 3:
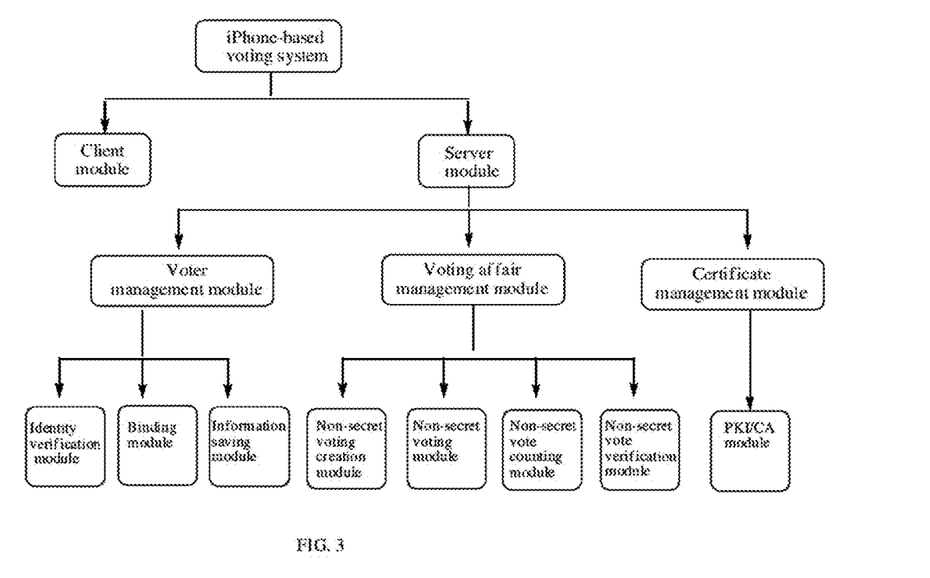
FIG. 3 is an illustrative functional structure of Voting System Example 2 of the invention.

As shown in FIG. 3, Example 2 is similar to the network connection map of Voting System Example 1. It differs from Voting System Example 1 in that it is specifically used in a non-secret voting. The voting system based on iPhones comprises multiple iPhones, a server device4, a client module 52, and a server module 62. Each iPhone1 is installed with a client module 52 which is used to temporarily save the voter's information, submit requests for verifying voter's identity, show the voting inquiries, and submit votes. The server module 62 is installed on the server device4. It comprises a voter management module 72, a certificate management module 92, and a vote affair management module; it is used to save the voter's information, verify the voter's registration and identity, issue and verify the voting certificate, create and publish the voting affair, and to calculate and publish the voting contents statistics. The client module 52 and the server module 62 perform digital communications through a mobile communication network3 or a mobile network2, such as 4G, 3G, GPRS, Wi-Fi, GSM or CDMA. For simplicity of illustration, the following Example uses only one iPhone1.

The voter management module 72 comprises an identity verification module 102, a binding module 112 and an information saving module 122. The identity verification module 102 is used to verify the voter's registration, i.e., verify whether the voter's information is correct and to send the results to the binding module 112. It is also used to verify the voter's identity. The binding module 112 is used to bind the verified voter one-to-one with the voter's iPhone number. The information saving module 122 is used to save the voters' information. The actual data structure in the voter management module 72 is the same as in Voting System Example 1 and it is not repeated here.

The voting affair management module 82 comprises a non-secret voting affair creation module 132, a non-secret voting module 142, a non-secret vote counting module 152, and a non-secret vote verification module 162. The non-secret voting affair creation module 132 is used to create a non-secret voting affair and publish it after the digital signature and to verify the voter's eligibility to vote. The non-secret voting module 142 is used for the digital signature and submission of the voting contents via a non-secret voting certificate. The non-secret vote counting module 152 is used to verify the completeness of the voting contents and the legitimacy of the voting certificate and to calculate and publish the statistics of the legitimate and complete voting contents of qualified voters. The non-secret vote verification module 162 is used to verify the validity of the voting contents according to the non-secret voting affair, the non-secret voting certificate, and the voter's information, wherein the structured data of the voting affair and the structured data of the voting matters are similar to those in Voting System Example 1. Example 2 differs from Example 1 only in that in Example 2, the voting affair is a non-secret voting affair.

The certificate management module 92 comprises a PKI/CA module 172. The certificate management module 92 is used to through the secure framework of the PKI/CA module 172 create a non-secret voting certificate which corresponds one-to-one with the voter's information and to verify the legitimacy of the non-secret voting certificate. The voter uses an iPhone1 to log into the voting system of this Example, clicks on the iPhone1 to create the non-secret voting certificate. The voter's iPhone1 automatically creates a certificate request and sends it by a 3G network or a Wi-Fi network to the server device4.

According to the voter's binding iPhone number, the certificate management module 92 sends a valid second random verification code to the voter by a voice or text message. The voter submits the second random verification code to the server device4. After the server device4 checks the current voter's identity, the contents of the certificate request and the second random verification code, it submits the voter's information to the PKI/CA module 172. The PKI/CA module 172 creates a standard non-secret voting certificate. Thereafter, the client module 52 on the iPhone1 automatically downloads the non-secret voting certificate and binds the non-secret voting certificate with the voter's information. In this voting system, the voter's information can be bound to only one valid non-secret voting certificate. If the current voter's information has already been bound to a valid non-secret voting certificate, the repeated binding is prohibited.

The voting process is as follows.

After using the iPhone1 to log into the voting system and manually select the voting affair and relevant voting matters, the voter executes the digital signature for the voting contents (i.e., the vote) with the standard digital signature technology using the non-secret voting certificate on the iPhone1 and submits the voting contents to the server device4 by a 3G network or a Wi-Fi network. Before submitting the vote, the voter clicks a "get verification code" button on the iPhone1, and the non-secret voting module 142 according to the voter's binding iPhone number sends a third random verification code to the voter by a voice or text message. The voter submits this third random verification code to the non-secret voting module 142. After the non-secret voting module 142 automatically verifies the voting contents, the voter's identity, the correctness of third random verification code, and voter's eligibility, the vote is saved in the non-secret voting table in order to proceed to the subsequent counting operation. In the non-secret electronic voting, the counting operation has two types, a real-time vote counting and a non-real-time vote counting. The real-time vote counting means that immediately after the voter casts the vote, the current voting statistics of the voting affair is calculated and the results are published. The non-real-time vote counting means that after the valid voting time period expires, the voting statistics of the current voting affair is then calculated and published. Before counting, the non-secret vote counting module 152 needs to verify the completeness of the voting contents, the legitimacy of the voting certificate, and the voter's voting eligibility. Only if these three conditions are met, i.e., complete voting contents, legitimate voting certificate, and eligible voter, the statistics of the non-secret voting contents is then calculated and the results are then published. No matter what counting method is used to count the votes, the non-secret vote counting module 152 in the voting affair management module 82 must perform the following operation: clearing the entire statistic results of the voting contents under the voting affair so that the initial counting operation can proceed.

The voter may use the non-secret voting certificate saved in the voter's iPhone1 to verify whether the voter's vote is included in the voting results and to check whether the voting contents are tampered with by any illegitimate person. The above-mentioned vote verification function is a preferred way for this Example. If this Example omits the vote verification function, it can still achieve the objective of the invention.

Voting Method Example 1

This is an iPhone1 based secret voting method. The voting method is installing a client module 51 on all iPhones and a server module 61 in a server module 61. The server module 61 comprises a voter management module 71, a certificate management module 91, and a voting affair management module 81. The client module 51 and the server module 61 perform digital communications through 4G, 3G, Wi-Fi, CSM or CDMA networks. A specified voting method is as follows: Step 1a: the server module 61 creates and publishes the voting affair; Step 2a: the voter via the client module 51 provides the voter's information to the server module 61 and according to the voter's information the server module 61 through the voter management module 71 saves the voter's information and verifies the voter's registration and identity; Step 3a: according to the voter's information and after the registration verification and identity verification, the server module 61 creates a secret voting certificate and sends the certificate to the client module 51; Step 4a: after executing the digital signature for the secret voting certificate via the client module 51, the voter submits the secret voting contents for the voting affair to the server module 61, and the server module 61 calculates the statistics of the voting contents and publishes the voting results.

In step 1a, the creation and publication of the voting affair are achieved by the secret voting affair creation module 131 in the voting affair management module 81. The secret voting affair creation module 131 in the voting affair management module 81 is used to create and publish the voting affair, and to verify the voter's eligibility.

In step 2a, the voter's information saving, registration verification and identity verification are achieved via the voter management module 71. The voter management module 71 comprises an identity verification module 101, a binding module 111, and an information saving module 121. The actual voter's information saving process is that the voter's information is saved by the information saving module 121; the actual registration verification process is that after the voter submits the voter's information to the server module 61, the identity verification module 101 verifies whether the voter's information is correct and sends the verified results to the binding module 111; when the voter's information passes the verification, the binding module 111 binds the verified voter's information one-to-one with the voter's iPhone number; otherwise no binding takes place. The actual identity verification process is that when the voter's information passes the verification and is bound with the iPhone number, the identity verification module 101 verifies the validity and legitimacy of voter's identity; otherwise no verification takes place. Further, for a very formal and relatively important voting, the voter's information needs to be seriously verified, and thus in the voting process, one or more verifiers may be pre-assigned to successively verify the voter's information according to the verification procedure set up in the voting system.

In this Example, the voting affair is a secret voting affair. The voting certificate is a secret voting certificate, wherein the secret voting certificate created in step 3a is created by the certificate management module 91. The certificate management module 91 comprises a PKI/CA module 171. The process for creating the secret voting certificate can be seen in FIG. 4. A specific process is as follows.

Figure 4:
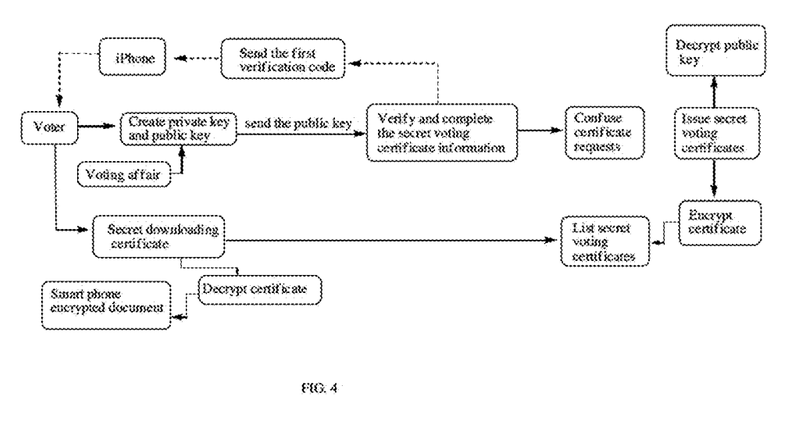
FIG. 4 is a flowchart of the secret voting certificate creation of Voting Method Example 1 of the invention.

Certificate requesting step: the voter performs the following operations for one or more voting affairs from the current voting affairs table via the client module 51. This Example is to select a secret voting affair to create a pair of asymmetrically encrypted keys and save them. This pair of encrypted keys includes a private key and a public key. Then the public key is encrypted and sent to the certificate management module 91 as a request for a secret voting certificate. The method of creating the encrypted key pair can be any method commonly used in this technology field for creating encrypted keys such as RSA random key encryption method. The above encrypted key pair is saved in the voting secret key file, and the voting secret key file is the voting secret key file which is saved in the iPhone flash memory card and encrypted via a special encryption method. The voting secret key file can be encrypted via a strong symmetric encryption method such as AES and 3DES etc. The name of the voting secret key file can be a combination of a fixed string prefix plus the voting affair ID. The client module 51 creates the keywords for the certificate identity and save them in the voting secret key file, e.g., the keywords can be a string of random codes created by the GUID algorithm.

This string of random codes is used as the "certificate identity keywords" of the current certificate request and saved in the voting secret key file; then the MD 5/SHA algorithm is used to create the "certificate identity keywords digital abstract." The combination of the "certificate identity keywords digital abstract" and the public key is serialized to the "binary contents." A "certificate request secret file" is created by using the public key of the public certificate published by the PKI/CA module 171 and by the encryption of the "binary contents." The MD5 or SHA algorithm is used to obtain the digital abstract of the above "binary contents" and to use it as the "certificate request digital abstract." The above "certificate request secret file" and the "certificate request digital abstract" are combined, serialized into binary contents and encoded via BASE64/16 into ASSII character; and the "certificate request package" is formed.

The verification obtaining procedure is as follows. The certificate management module 91 receives the secret voting certificate request, creates a first random verification code, and then sends the first random verification code to the voter via the binding iPhone number obtained from the voter management module 71. The voter then sends the first random verification code which the voter received to the certificate management module 91. The first random verification code is a string of random codes which is randomly formed via the server module 61, has a specific length, and consists of numbers and letters. The voter is informed of the first random verification code via a voice or short text message. By "a voice message," it means dialing a telephone call and sending the above prompt to the voter via a voice message. By "a short text message," it means sending the prompt to the voter's iPhone1 via a short text message. The procedure is that the prompt message is formed according to the specific contents of the secret voting affair selected by the voter and the first random verification code and it is sent to the voter's iPhone1 via an interface provided by a third party telecommunication service provider. The contents of the prompt message can be formed via a given module, e.g., Dear Zhang-San, Hello! Your verification code of the certificate request for the 'Photographer Association first meeting of 2012 for the Standing Committee election' is "AB134LD."

Verification requesting step: the certificate management module 91 verifies whether the first random verification code which the voter sent is the same as the saved first random verification code. The secret voting affair creation module 131 in the voting affair management module 81 verifies whether the voter has the voting eligibility and whether the voter previously requested a secret voting certificate. When all of the conditions are met, i.e., the first random verification codes are consistent, the voter is eligible to vote, and the voter did not previously request the secret voting certificate, the certificate module allows the secret voting certificate request, send a command to the PKI/CA module 171, and proceed to the creation request step. Otherwise, the secret voting certificate request is denied and the secret voting certificate creation process terminates.

For particularly important or critical voting affairs, manual validation can be added. Voter's identity can be double-checked by personal telephone calls. The addition of manual verification to the above voting method can further the objective of this invention for achieving secure, fast, and convenient voting.

The request creation step is as follows. The name, purpose and valid voting period of the certificate, request for signature and request for a secret voting certificate are serialized to create a voting certificate request package which is then saved. The voting certificate request package is then sent via mobile internet such as 3G network or Wi-Fi network to the PKI/CA module 171. In the above certificate request step, the voter's certificate request only contains the public key information of the voter. This is why it needs to create the important contents such as the name, purpose, and valid voting period etc. Because the voting certificate created in this Example is a secret voting certificate, the important information such as the purpose and valid voting period must be strictly controlled. In this step, the voter's secret voting certificate request time for the voting affair, the voter's user ID, the voting affair ID, the mobile phone number and the mobile phone verification number, i.e., the iPhone number and iPhone verification number, must be recorded in order to prevent the voter from applying for more than one secret voting certificate for the same voting affair. This record is also used for auditing review in the certificate request procedure. The rules for creating the request elements are as follows. The name of the certificate is a fixed string, such as "secret voting certificate." The purpose of the certificate is generated by the voting affair ID and the voting affair subject, such as "10001_Photographic Association, the first Standing Committee by-election of 2012_Voting Special Use". If the certificate is used for more than one voting affairs, the affairs can be listed by a table. The valid voting period of the certificate corresponds to the voting period of the voting affair. If the certificate is used for multiple voting affairs, the valid voting period of the certificate can be from the starting time of the earliest voting to the ending time of the latest voting, e.g., "2012.2.1 8:00 to 2012.2.3 8:00." The signature of the certificate request is formed as follows. The above name, purpose, and valid voting period of the certificate, and the digital abstract of the certificate request submitted by the voter are serialized and the digital signature is executed for the digital certificate via the certificate management module 91, and the certificate request signature is thus formed. The above name, purpose, and valid voting period of the certificate, and the certificate request secret file data submitted by the voter are serialized to create a complete secret voting certificate request data package.

Figure 5:
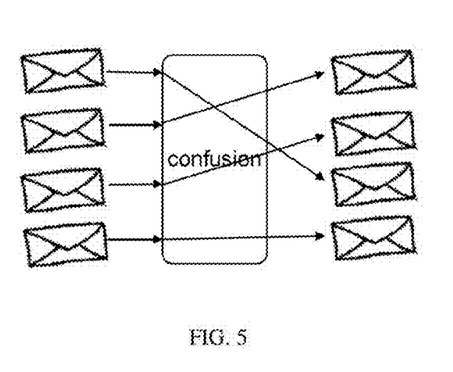
FIG. 5 an illustrative diagram for the certificate shuffling results of Voting Method Example 1 of the invention.

Preferably, in order to prevent others from deriving the relationship between the secret voting certificate and the voter based on the time of the submission of the certificate request and the time of issuance of the final secret voting certificate, the secret voting certificate request data package created in the above creation request step is not immediately sent to the PKI/CA module 171 but temporarily saved in a disk file waiting for reaching a certain threshold parameter. The threshold parameter can be set according to the actual situation, being a positive integer greater than 1. For example, when the number of the secret voting certificate request data packages reaches one 100, these data packages are in a random order sent to the PKI/CA module 171 so that the correspondent relationship between the order of the certificate requests and the order of the certificate insurance is eliminated. In general, the order of the certificate requests and the order of the certificate insurance are consistent, i.e., the "First In, First Out." The process described above is called confusion step and its effectiveness of the implementation can be seen also in FIG. 5. FIG. 5 illustrates the results of the certificate confusing step, at the left the 4 certificate request data packages are output in a different random order after the confusion step. In special situations where the number of the secret voting certificate request data packages cannot reach the threshold parameter, special strategies can be used, such as a strategy of waiting for time-out, waiting for a few minutes and then submitting the data packages to the PKI/CA module 171. The waiting time period can be set according to the actual situation, which can be a positive integer greater than 1. The certificate confusion step can better protect the secrecy of the voting. However, the objective of the invention can be achieved no matter whether or not the certificate confusion step is used.

Certificate issuing step: The PKI/CA module 171 uses the private key to decrypt the secret voting certificate request data package and then verifies the completeness and legitimacy of the decrypted secret voting certificate request data package. If the data package is complete and legitimate, the PKI/CA module 171 creates and saves the secret voting certificate. If not, the PKI/CA module 171 does not create the secret voting certificate. After the PKI/CA module 171 receives the secret voting certificate request data package, it uses the private key to decrypt the cipher text of the secret voting certificate request data package and get the certificate identity keywords digital abstract submitted by the voter and the voter's public key. According to the above decrypted data, the digital abstract of the certificate request is obtained using the standard digital digest algorithm. The PKI/CA module 171 uses the standard electronic signature verification algorithm to verify, according to the certificate request signature provided by the voting affair management organization, the completeness of the secret voting certificate request data package, i.e., to verify the name, purpose, and valid voting period of the certificate and the completeness of the digital abstract of the certificate request, and to verify whether the relevant contents have been illegally tampered. Verifying the legitimacy of the secret voting certificate request data package is to verify whether the secret voting certificate is issued by the specified voting affair management organization, to verify whether the secret voting certificate is issued by the PKI/CA module 171 of this voting system, and to verify whether the secret voting certificate is within the valid voting period. After the above verification step, a secret voting certificate is created via a standard secret voting certificate issuing method, a digital abstract of this secret voting certificate is simultaneously computed as the only identity of this secret voting certificate, and it is checked from the existing certificates table whether or not this identity already exists. If this identity already exists, it means that different voters create the same public key (i.e., the same secret voting certificate exists; the probability for this is low). In this case, a string of random characters is created and added to the name of the certificate, and a new secret voting certificate is created. The above procedure is repeated until a secret voting certificate that has never used is created. The secret voting certificate is saved in the established certificates table which contains the secret voting certificate identity, the secret voting certificate contents, the secret voting certificate request contents and the certificate issuing time. In order to allow the voter to download the voter's own secret voting certificate, the secret voting certificate is encrypted via a public key encryption into a secret file and is saved in the secret certificate downloading table which contains the certificate identity keywords digital abstract, the certificate secret file, and an indication whether downloading has taken place.

Certificate downloading step: the voter may check at a given time via the client module 51 whether the certificate issuing step is complete. If it is complete, the client module 51 automatically downloads the secret voting certificate. If it is not complete, there is no downloading. The certificate downloading step uses the secret downloading and thus the voter does not have to use the voter's real name to log into the downloading system. The detailed downloading steps are as follows. The first step is to check at a given time; the client module 51 on the voter's iPhone1 automatically starts the service of the service desk, sends the certificate identity keywords to the server device4 at a given. The server module 61 uses MD5 or SHA algorithm to obtain the certificate keyword digital abstract, check whether there is a secret voting certificate in the secret certificate downloading table. If it exists, the voter will be made aware of the certificate identity keywords by iPhone screen, iPhone voice, iPhone vibration, or combinations thereof; the certificate identity keywords will not be made to known to others. The certificate is downloaded and installed after the above timed check step. The client module 51 automatically downloads the secret voting certificate and after the voter manually enters an encrypted password, it obtains the private key from the corresponding voting secret key file and uses it to decrypt the secret voting certificate. If the decryption succeeds, the decrypted secret voting certificate is saved in the above voting secret key file and the server module 61 will be called and the secret voting certificate downloading table will show "yes" on the indicator of whether the secret voting certificate has been downloaded. If more than one secret voting certificate is found, more than one voter is provided with the same password. The probability of duplication is about 1 over $2^{128}$. In this case, the voters may each use their own private key to decrypt and the successfully decrypted secret voting certificate is the corresponding voter's secret voting certificate. Otherwise, if the above decryption operation fails, the voting certification is not the voter's certificate. Further checks can be done by the iPhone service desk.

In this Example, the voting contents of the secret voting affair are secret. The statistics of the voting contents is the statistics of the secret voting contents. In step 4a, after the voter via the client module 51 uses the secret voting certificate to execute the digital signature, the voting contents of the secret voting affair are submitted to the server module 61. The server module 61 calculates the statistics of the valid secret voting contents and publishes the results via the voting affair management module 81. The voting affair management module 81 comprises the voting affair creation module, the secret voting module, the secret vote counting module 151, and the secret vote verification module 161. A detailed procedure follows.

Submitting step: the secret voting affair creation module creates the secret voting affair. The voter uses the secret voting certificate to execute the digital signature and sends the secret voting contents after encrypted to the secret voting module. After the voter confirms the voting on iPhone1, the client module 51 serializes the selected voting affair file, i.e., the voting affair file issued by the voting affair management organization and executed for the digital signature, and the selected voting matter into a voting contents binary document. The client module 51 according to the voting affair ID finds the corresponding voting private key file. The voter manually enters an encrypted password, uses the secret voting certificate in the voting private key file to execute the digital signature for the above voting contents binary document, creates the signature document of the voting contents, and then uses the public key of the counting certificate of the voting affair to encrypt the voting contents signature file and to create the cipher text of the voting contents signature file, and then use the voter's secret voting certificate to execute a second digital signature for the serialized contents of the voting contents signature secret file and the voting affair to create the voting contents secret file signature document and send it to the secret voting module.

Verification step: the secret voting module receives the voting contents, verifies whether or not the secret voting affair is within the valid voting period, through the PKI/CA module 171 verifies whether or not the secret voting certificate is legitimate, verifies whether the secret voting certificate and the secret voting affair are corresponding, and verifies whether or not the data is complete. When all of these conditions are met, valid voting time period, legitimate voting certificate, and correspondence between secret voting certificate and the secret voting affair, and complete data, the secret voting module saves the secret voting contents and then goes to the counting step. Otherwise, the secret voting module does not save the secret voting contents and the procedure does not proceed to the step for the statistics calculating and publishing of the secret voting contents. In the verification step, the secret voting module automatically verifies whether the current secret voting affair is within the valid voting period, whether the current voting certificate is issued by the PKI/CA module 171 (whether legitimate), whether the signature data is tempered by any illegitimate person (whether the data is intact), according to the certificate name verifies whether the current secret voting certificate can be used for the current secret voting affair (whether the secret voting certificate matches with the secret voting affair). After the voting contents pass the legitimacy test, the secret voting module saves the secret voting contents in a voting contents table. The voting contents table contains the voting affair ID, the secret voting certificate digital abstract, the secret document of the voting contents and the public document of the voting contents. The secret document of the voting contents is the signature document of the voting contents secret file, and the public document of the voting contents is the signature document of the voting contents obtained after decryption during the counting step. When the voting contents are being saved, if the same voting certificate digital abstract exists in the voting contents table, it means that the voter has already voted, and this record will be deleted. The current voting contents are added to the following two voting information items: the secret voting certificate digital abstract and the secret document of the voting contents.

Counting step: the secret vote counting module 151 uses the private key to decrypt the secret voting contents and via the PKI/CA module 171 verifies whether the secret voting certificate is legitimate and whether it matches with the secret voting affair, it verifies whether the voting contents are complete and whether the voting process is legitimate. If all the conditions are met at the same time, legitimate and consistent secret voting certificate, complete voting contents, and legitimate voting process, the statistics of the voting contents is calculated and published. Otherwise, the statistics is not calculated and published. In order to ensure the secrecy of the voting, the secret voting uses a non-real-time counting method, which means that the counting operation implement after the valid voting period has passed. The counting operation is traversing the voting contents table and uses the following method to verify the legitimacy of the voting contents. First, the private key of the electronic counting certificate is used to decrypt the secret document of the voting contents, obtain the data of the public document, and save it to the public document of the voting contents on the voting contents table. Then the standard algorithm is used to respectively verify the legitimacy of secret voting certificates in the secret document of the secret voting contents and the public document of the secret voting contents, verify the completeness of the signature contents, verify the legitimacy of the certificate to the voting affair document, verify whether the secret voting certificates in the secret document of the secret voting contents and in the public document of the secret voting contents are consistent with the voting affair document, and verify whether the MD5/SHA digital abstract of the secret voting certificate and the secret voting certificate digital abstract are consistent. According to the voting algorithm of the voting affair, it is verified whether the selection items of the current voting affair are correct, e.g., verifying the number of the voting matters of each vote is within the specified number. The method for verifying the legitimacy of the voting procedure is to verify whether the number in the voting contents table is less than or equal to the number of the "yes" answers to the question "whether downloaded" in the secret voting certificate downloading table; verify whether the number of the secret voting certificate downloading table is equal to the established secret voting certificate table; verify the number of the established certificate table is equal to the certificate request table; verify whether the user ID in the certificate request table exists in the voter's ID table; verify whether the iPhone number in the certificate request table is the same as the iPhone number in the voter's ID table; according to the voter conditions of the voting affair verify whether the voter is eligible to vote for the current voting affair; verify whether the iPhone number of the voting affair in the certificate request table is unique, i.e., one iPhone number corresponds to only one voter; via the standard signature algorithm verify the completeness of the signature contents in the secret voting certificate request contents of the traverse certificate request table; verify whether the signature certificate is legitimate and whether it is used by the voting center; and verify whether the public key digital abstract in the secret voting certificate request is consistent with the public key digital abstract in the secret voting certificate contents. After the above verification procedure has been performed and the verification of legitimacy of the voting process has been completed, the secret vote counting module 151 then calculates the statistics of the valid votes and according to the vote determination method of the voting affair, calculate the statistics of the number of the voters, the total number of votes, the number of valid votes, the number of each voting matter, and the voted matters, and execute digital signature for the above statistics and the vote counter's digital certificate used in the voting affair document and the publish the results. Otherwise, there will be no calculation or publication of the statistics. Optionally, if there is need for a public notary to notarize, the public notary must use the public notary's own digital certificate to execute signature for the above statistic results.

The vote verification is achieved by the secret vote verification module 161; a detailed procedure is as follows.

Requesting step: the voter submits a vote verification request for a secret voting affair to the secret voting affair office; the voter selects on iPhone1 a voting affair, the client module 51 sends the voting affair ID of the secret voting affair to the secret vote verification module 161 of the voting system.

Searching step: the secret voting verification module searches for the existence of the corresponding secret voting contents according to the secret voting affair and the secret voting certificate; if they are found, it proceeds to the verification step; otherwise, a prompt indicates that they were not found, and it exits the above vote verification procedure. The server module 61 receives the above information and according to the secret voting affair ID and the current user ID searches for the corresponding valid voting contents in the voting contents table. If they are not found, it means that the vote counting results do not include this voter's voting information; if the relevant voting record is found, it proceeds to the verification step.

Verification step: this step verifies whether the secret voting contents are complete and whether the voter's public key is the same as the public key of the secret voting certificate. When the secret voting contents are complete and the public keys are the same, prompt shows that the vote verification is successful; otherwise, prompt shows the inconsistent verification results. It verifies whether the voting contents public document is complete and whether the public key of the secret voting certificate is the same as the public key which is to be verified. If the voting contents are complete and the public keys are the same, the verification passes, indicating that the voter's voting contents were included in the counting results and not illegitimately tampered. Preferably, after the voting contents and the counting results are confirmed, the voter can manually delete the voting private key file saved on the iPhone1 to prevent it from careless leaking and causing negative effect. After the private key file is deleted, the voter will no longer be able to use the verification function.

Voting Method Example 2

This is an iPhone1 based non-secret voting method. The non-secret voting method is installing a client module 52 on each and all of the iPhones and a server module 62 on the server device4. The server module 62 comprises a voter management module 72, a certificate management module 92, and a voting affair management module 82. The client module 52 and the server module 62 perform digital communications through 4G, 3G, Wi-Fi, GSM, or CDMA networks. The voting method is as follows: step 1b: the server module 62 creates and publishes the voting affair; step 2b: the voter via the client module 52 provides the voter's information to the server module 62 and the server module 62 according to the voter's information via the voter management module 72 saves the voter's information and verifies the voter's registration and identity; step 3b: the server module 62 according to the voter's information and after the registration verification and identity verification creates a voting certificate which corresponds one-to-one with the voter's information and sends the certificate to the client module 52; step 4b: after executing the digital signature for the voting certificate via the client module 52, the voter submits the voting contents for the voting affair to the server module 62, and the server module 62 calculates the statistics of the voting contents and publishes the voting results.

In step 1b, the creation and publication of the voting affair are achieved by the voting affair creation module. The voting affair creation module is used to create the voting affair and publish the voting affair after passing the digital signature, and it is also used to verify the voter's eligibility.

In step 2b, the voter's information saving, registration verification and identity verification are achieved via the voter management module 72. The voter management module 72 comprises an identity verification module 102, a binding module 112 and an information saving module 122. The actual voter's information saving process is involves that the voter's information is saved by the information saving module 122; the actual registration verification process is that after the voter submits the voter's information to server module 62, the verification module verifies whether the voter's information is correct and sends the verified results to the binding module 112; when the voter's information passes the verification, the binding module 112 binds the verified voter's information one-to-one with the voter's iPhone number; otherwise no binding takes place. The method for the voter's information saving, registration verification and identity verification is the same as that in Voting Method Example 1, and it is thus not repeated here.

Figure 6:
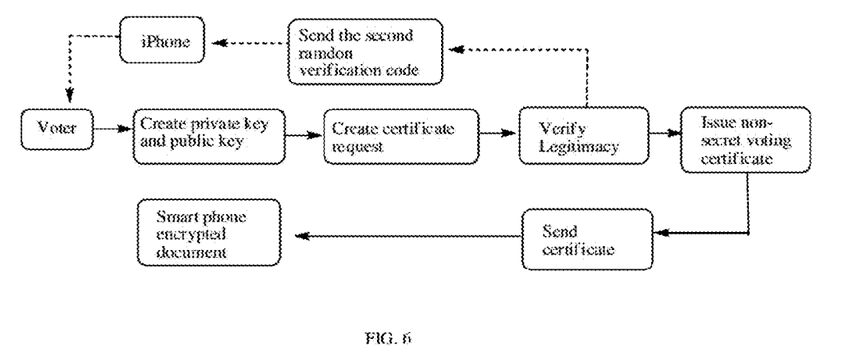
FIG. 6 is a flowchart of the non-secret voting certificate creation of Voting Method Example 2 of the invention.

In this Example, the voting affair is a non-secret voting affair. The voting certificate is a non-secret voting certificate which corresponds only to the voter's information. In this Example, the execution order of step 1b and step 2b are in the reversed order. Of course, step 1b and step 2b can be also executed sequentially or simultaneously. For the non-secret voting method, step 1b and step 2b can be presented in no particular order. In above step 3b, the creation of the non-secret voting certificate is achieved via the certificate management module 92. The certificate management module 92 comprises a PKI/CA module 172. The process for creating the non-secret voting certificate can be seen in FIG. 4. A specific process is as follows.

Binding checking step: this step checks whether or not the voter is bound with the use of a valid non-secret voting certificate. If the voter has been bound, the non-secret voting certificate creation step ends. If the voter has not been bound, it proceeds to the creation request step; this step is to check whether the current voter is bound with a valid non-secret voting certificate. If bound, re-creation is prohibited. In the voting method of this Example, a voter can only be bound with one valid non-secret voting certificate at a given time period. If the current voter lost the non-secret voting certificate or suspects that the second random verification code is leaked, the voter needs to request that the PKI/CA module 172 cancels the current non-secret voting certificate and recreate a new one.

Certificate creation request step: a non-secret voting certificate package is created based on the voter's information and is sent to the certificate module after encryption. The voter via the client module 52 on iPhone1 uses the standard algorithms to create a standard non-secret voting certificate request package, wherein the name of the certificate is composed of the current voter's name and the user ID information etc., e.g., "OU=Zhang-san, OU=10001". The above voting certificate request package and corresponding private key are saved in the voting private key file. The encryption code of the voting private key file is manually entered by the voter, wherein the voting private key file is saved in the voter's iPhone flash card using specific encryption algorithm.

Verification obtaining step: the certificate management module 92 receives the encrypted non-secret voting certificate request package, creates a second random verification code, and then sends the second random verification code to the voter by the binding iPhone number obtained from the voter management module 72. The voter then sends the received second random verification code back to the certificate management module 92. To achieve this step, the voter can click "get certificate number" button on the iPhone1. The server module 62 through the current voter's binding iPhone number sends the second random verification code created by the certificate management module 92 to the voter by voice or text message. The second random verification code is a string of random codes of specific length and composed of numbers and letters. After receiving the second random verification code, the voter manually fill it in the information item specified in the certificate creation request window.

Verification request step: the certificate management module 92 verifies whether the second random verification code which the voter sent is the same as the saved second random verification code, verifies whether the voter previously requested a non-secret voting certificate, verifies whether the information in the non-secret voting certificate request package is consistent with the information in the voter's registration, and verifies whether the non-secret voting certificate request package is complete. When all of the conditions are met, i.e., the second random verification codes are consistent, the voter did not previously request the non-secret voting certificate, the voter's information is consistent and the non-secret voting certificate request package is complete, the certificate module allows the non-secret voting certificate request, sends a issuing command to the PKI/CA module 172, and proceeds to the certificate issuing step. Otherwise, if any of the conditions in the above verification procedure is not met, the non-secret voting certificate request is rejected.

Certificate issuing step: the PKI/CA module 172 according to the contents of the non-secret voting certificate request package creates a voting certificate and saves it. The certificate management module 92 uses the API of the PKI/CA module 172 to create a standard non-secret voting certificate according to the contents of the non-secret voting certificate request package and saves it to the voter's personal certificate table.

Certificate downloading step: the voter may check at any given time via the client module 52 whether the certificate issuing step is complete. If it is complete, the client module 52 automatically downloads the non-secret voting certificate. If it is not complete, there will be no downloading. The voter through the client module 52 on iPhone1 automatically starts the services of the service desk and uses the server module 62 to check at any given time whether the corresponding non-secret voting certificate has been created. If the voter's personal certificate table has existed, it will be automatically downloaded onto the iPhone1 and the voter will receive a prompt to enter the encryption code and save this non-secret voting certificate to the voting secret key file.

In this Example, the voting contents of the non-secret voting affair are non-secret voting contents. Therefore, the statistics of the voting contents is the statistics of the non-secret voting contents. For the non-secret voting method, two different activation strategies for vote counting can be used. One strategy is real-time vote counting, i.e., after the voter submits the vote, the non-secret vote counting module 152 automatically calculates according to the voting affair ID of the voting contents signature file the statistics of the vote of the voting affair. This strategy does not require encryption treatment of the non-secret voting contents. Another strategy is non-real-time vote counting method, i.e., after the valid voting period has ended, the non-secret vote counting module 152 according to the voting affair ID of the voting contents signature file automatically calculates the votes for the voting affair. This strategy requires encryption of the non-secret voting contents. No matter whether it is real-time vote counting or non-real-time vote counting, before the vote counting, it must be verified whether the voting contents signature file is complete, whether the voting certificate is legitimate, and whether the voter has voted repeatedly. In step 4b, after the voter through the client module 52 and using the non-secret voting contents executes the digital signature, the non-secret voting contents of the non-secret voting affair are submitted to the server module 62 and the server module 62 calculates the statistics of the non-secret voting contents and publishes the results. The above process is achieved through the voting affair management module 82. The voting affair management module 82 comprises a non-secret voting affair creation module, a non-secret voting module, a non-secret vote counting module 152, and a non-secret vote verification module 162. A specific process is as follows:

Voting verification step: the voter submits a request for a certificate verification code to the non-secret voting module, the non-secret voting module creates a third random verification code and send it to the voter's binding iPhone number. The third random verification code is a string of random code which is randomly formed by the server module 62; it has a specific length and consists of numbers and letters.

Vote submitting step: the voter submits the third random verification code and the non-secret voting contents to the non-secret voting module.

Content verification step: the non-secret voting module verifies whether the non-secret voting affair is within the valid voting period, it verifies whether the third random verification code that the voter sent is the same as the third random verification code that is saved, through the PKI/CA module 172 verifies whether the non-secret voting certificate is legitimate, verifies whether the non-secret voting certificate corresponds with the voter's information, and verifies whether the voter is eligible to vote; when all of the conditions are met, i.e., the non-secret voting is within the valid voting period, the third random verification codes correspond, the non-secret voting contents are complete, the non-secret voting certificate is legitimate, the voter's information is consistent, and the voter is eligible to vote, then the non-secret voting contents are saved and proceed to the non-secret contents statistics calculating step; otherwise, the non-secret voting contents are not saved and it exit the non-secret contents statistics calculating and publication step. When the non-secret voting contents are being saved, if it is found that the voting contents table has had the same user ID, indicating this voter has voted before, this record is then deleted and the current voting contents are added to the voting contents table.

Voting contents statistics calculating step: the non-secret vote counting module 152 via the PKI/CA module 172 verifies whether the non-secret voting certificate is legitimate, verifies whether the non-secret voting contents are complete, verifies whether the voting process is legitimate, and verifies whether the voter is eligible to vote; when all of the conditions are met, i.e., the non-secret certificate is legitimate, the non-secret voting contents are complete, the voting process is legitimate, and the voter is eligible to vote, then the non-secret voting contents statistics is calculated and published; otherwise, the statistics is not calculated or published.

Preferably, the voter may verify the non-secret voting contents which are submitted by the voter. The voting verification procedure is achieved through the non-secret vote verification module 162; the detailed procedure is as follows:

Request submitting step: the voter submits the voting verification request for the non-secret voting to the non-secret vote verification module 162. The voter selects a voting affair on iPhone1. The client module 52 reads the non-secret voting certificate from the voting secret key file. After the voter manually enters a decryption code, the voter reads the public key in the voting secret key file. The client module 52 sends the voting affair ID and the public key to non-secret vote verification module 162 of the voting system.

Information searching step: the non-secret vote verification module 162 performs search according to the non-secret voting affair, the voter's information and the non-secret voting certificate for the existence of corresponding non-secret voting contents; if they are found, proceed to the information verification step; otherwise, a prompt appears indicating they are not found and exit the voting verification procedure. After the non-secret vote verification module 162 receives the information from the client module 52, it uses the digital digest algorithm to obtain a public-key digest and according to the voting affair ID and the voting certificate digital digest looks for the voting contents table corresponding to the valid voting contents. If not found, it indicates that the vote counting results do not include the voter's voting information. If the relevance voting record is found, then proceed to the information verification step.

Information verification step: this step verifies whether the non-secret voting contents are complete and whether the non-secret voting certificate corresponds with the voter's information; when the non-secret voting contents are complete and the non-secret voting certificate corresponds with the voter's information, a prompt appears indicating that the information verification succeed; otherwise, a prompt appears indicating the voting verification failed. This step is to verify whether the voting contents public file is complete and whether the non-secret voting certificate used for the digital signature is the voter's own certificate. If both verifications succeed, it indicates that the current voter's non-secret voting contents are included in the vote counting results and the voting contents are not tampered illegitimately.

In the secret electronic voting methods disclosed in the voting system examples and voting method examples, the secret electronic voting uses a blind signature, an innovation based on the Hybrid Theory and FOO agreement. Compared to the traditional electronic voting methods, such as the voting method of the FOO agreement, a remarkable feature of the voting method of the invention is that it uses a blind signature for the voting certificate, focuses on blinding the voting certificate information, and by blinding and securitizing the voting certificate achieves the "anonymity" technical target. In the traditional electronic voting agreement, the voter's voting contents are the blinding focus. When voting, the voter only uses the secret voting certificate to execute the digital signature and does not need to enter any voter's information. This invention uses the vote counting certificate public key to encrypt the voting contents. Therefore, the whole voting process is anonymous. Even if someone illegitimately monitors the wireless mobile internet, this person cannot obtain the voter's personal information and the voting contents.

In the secret electronic voting methods disclosed in the voting system examples and voting method examples, one voter can only be bound with one valid certificate at any given time. If the voter has been bound with a valid certificate, repeated binding is prohibited. In summary, this invention has a higher level of security; it can be widely used in all types of formal electronic voting in which stringent data security is required, such as the voting of urban communities for neighborhood committee management related issues, the voting of a variety of related matters within civil society, the voting of business shareholders, and the voting of corporate board of directors.

In the actual process, when there are a relatively large number of voters for a specific voting affair, the present voting system can be deployed in a dispersive manner. Each electoral constituency can have a server module 62. When voters vote, the client module 52 automatically submits the votes according to the electoral constituency of the voters to the corresponding server module 62. The server module 62 of each electoral constituency will automatically report the vote counting results to a central server device4, and then the central server device4 will calculate the statistics for the final voting results.

The above voting system examples and voting method examples are implemented based on the iPhone1. As alternatives to the above examples of the invention, the client module 5 of the invention can be installed on the iPad or various android smart phones or other smart mobile communication devices. When this invention is used in a cell phone having at least the functions of calling and text messaging plus a PC having internet capability, the client module 5 is installed in the PC having internet capability. Obtaining the random verification code and the binding number corresponding to the voter's information is achieved by the above cell phone having at least the functions of calling and text messaging. Other functions are similar to the above examples.

PC that has the function of calling and internet capabilities, such as SAMSUNG P1000, is a tablet PC having a calling function. It has a standard SIM card slot. As long as a SIM card is inserted into the SIM card slot, it will implement the functions of both the internet and phone at the same time. The application of this invention in this type of smart mobile communication device is the same as the above examples. It only needs to install the client module (51,52) in the PC and to install the server module (61,62) on the server device4.

Another alternative to the above voting system examples is a voting system which combines the above secret voting function and non-secret voting function, i.e., a combination of the voting system in above Voting System Example 1 and Voting System Example 2. Its structure, connection method, and major functions are the same as those in the above examples. Similarly, the client module (51,52) is installed on the smart mobile communication device and the server module (61,62) is installed on the server device4. The client module (51,52) and the server module (61,62) communicate digital data via the mobile communication network3. The server module (61,62) comprises a voter management module (71,72), a vote affair management module, and a certificate management module (91,92). The difference is that the vote affair management module comprises a voting affair creation module, a voting module, a vote counting module, and a vote verification module. The voting affair creation module is used to create the secret voting affair, to execute digital signature and publish the voting affair, and to verify the voter's voting eligibility in the secret voting affair. The voting module is used to execute the digital signature by the secret voting certificate for the voter's secret voting contents, encrypt, and submit them. The voting module is also used to execute the digital signature by the non-secret voting certificate for the non-secret voting certificate for the non-secret voting contents and submit them. The vote counting module is used to decrypt the secret voting contents, to verify the legitimacy of the secret voting contents and the voting process after the secret voting contents are decrypted, to calculate the statistics of the legitimate secret voting contents of the above voting process publish the results via the digital signature. The vote counting module is also used to verify the completeness of the non-secret voting contents and legitimacy of the non-secret voting certificate, to verify the voter's eligibility during the vote counting process, and to calculate the statistics of the complete and legitimate non-secret voting contents and non-secret voting certificate of eligible voters and publish the results. The vote verification module is used to verify the validity of the voting contents according to the secret voting affair and the secret voting certificate. The vote verification module is also used to verify the validity of the non-secret voting contents according to the non-secret voting affair, the voter's information, and the non-secret voting certificate. The certificate management module (91,92) comprises a PKI/CA module (171,172). The certificate management module (91,92) is used to create the secret voting certificate and to verify the legitimacy of the secret voting certificate. The certificate management module (91,92) is also used to create the non-secret voting certificate that corresponds one-to-one with the voter's information and to verify the legitimacy of the non-secret voting certificate. That means to set forth the features of the voting affair and the voting contents for "non-secret" or "secret" and perform relevant operations according to these features. Clearly, the above alternatives may be applied to the voting method examples. Detailed implementation steps can be seen in the above voting method examples, which are not repeated here.

What is claimed is:

1. A smart mobile communication device-based voting system, comprising a plurality of smart mobile communication devices each having a client module installed therein, the client module being configured to create, by one or more processors, a voting certificate request package including serialized voting information, to temporarily store, by one or more processors, a voter's information, to submit, by one or more processors, a request for verifying a voter's identity, to show, by one or more processors, a voting inquiry, and to submit, by one or more processors, a vote; and a server being configured to communicate with the plurality of smart mobile communication devices over a mobile communication network, the server comprises a voter management module, a certificate management module, and a voting affair management module, the server being further configured to, via one or more processors:

form and publish, via a server module of the server, a secret voting affair, the secret voting affair is formed through a secret voting affair creation module of the voting affair management module;

receive voting certificate request packages from each of the smart mobile communication devices, each of the voting certificate request packages being created by respective client modules of the smart mobile communication devices;

temporarily save the voting certificate request packages in a disk file until a predefined number of certificate request packages is accumulated;

release the voting certificate request packages to a PKI/CA module of the certificate management module when the predefined number of certificate request packages is accumulated on the disk file, wherein the voting certificate request packages are released in a second sequence that differs from a first sequence in which the voting certificate request packages were received by the server;

create a plurality of secret voting certificates via the certificate management module according to respective ones of the voting certificate request packages and through the use of asymmetric encryption keys;

issue the secret voting certificates to respective ones of the smart mobile communication devices in a sequence of issuance that corresponds to the second sequence;

receive voting contents corresponding to the voting affair from a plurality of voters using the smart mobile communication devices after the voters use the secret voting certificates to execute digital signatures through respective client modules; and calculate statistics of the voting contents received from the smart mobile communication devices and publish the results.

2. The voting system of claim 1, wherein the voting affair management module comprises a secret voting affair creating module, a secret voting module, and a secret vote counting module; wherein the secret voting affair creating module is used to create, by one or more processors, the secret voting affair, publish, by one or more processors, the secret voting affair via digital signature, and verify, by one or more processors, the plurality of voters' eligibility; the secret voting module is used to employ, by one or more processors, the voting certificate to execute digital signature for the plurality of voters' voting contents, and to submit, by one or more processors, the voting contents with encryption; the secret vote counting module is used to decrypt, by one or more processors, the voting contents, verify, by one or more processors, the legitimacy of the voting contents and the voting procedure after decryption, and to calculate, by one or more processors, the statistics of the voting contents in the voting procedure and publish, by one or more processors, the statistics through a digital signature.

3. The voting system of claim 2, wherein the vote verification module is a secret vote verification module; and wherein the secret vote verification module is used to verify, by one or more processors, the validity of the voting contents according to the secret voting affair and the secret voting certificate.

4. The voting system of claim 3, wherein the certificate management module is configured to create, by one or more processors, the secret voting certificates and to verify, by one or more processors, the legitimacy of the secret voting certificates.

5. The voting system of claim 1, wherein the at least one smart mobile communication device is configured to receive, by one or more processors, telephone calls and/or text messages.

6. A voting method based on a smart mobile communication device, said voting method comprising installing a client module on the smart mobile communication device and installing a server module on a server device; wherein the server module comprises a voter management module, a certificate management module, and a voting affair management module; wherein the client module and the server module perform digital communications through a mobile communication network; wherein the procedure of the voting method is performed by one or more processors and comprises:

forming and publishing, via the server module a secret voting affair, the secret voting affair is formed through a secret voting affair creation module of the voting affair management module;

the server receiving a voting certificate request package from the smart mobile communication device, the voting certificate request package being created by the client module of the smart mobile communication device and including serialized voting information including a name, purpose, and valid voting period of a certificate being requested;

the server temporarily saving the voting certificate request package in a disk file along with a plurality of other voting certificate request packages also received by the server module from a plurality of other smart mobile communications devices on the mobile communication network until a predefined number of certificate request packages is stored;

releasing the voting certificate request package and the plurality of other voting certificate request packages to a PKI/CA module of the certificate management module when the predefined number of certificate request packages is stored on the disk file, wherein the voting certificate request package and the plurality of other voting certificate request packages are released in a sequence that differs from the sequence in which the voting certificate request package and the plurality of other secret voting certificate request packages were received by the server module;

creating a secret voting certificate via the certificate management module according to the voting certificate request package and through the use of asymmetric encryption keys including a private key and a public key;

the server sending the secret voting certificate to the smart mobile communication device and a plurality of other secret voting certificates to the plurality of other smart mobile communication devices, the plurality of other secret voting certificates being created by the certificate management module according to the plurality of other voting certificate request packages, the server sending the secret voting certificate and the plurality of other secret voting certificate packages in a sequence corresponding to the sequence in which the voting certificate request package and the plurality of other voting certificate request packages were released to the PKI/CA module;

the server receiving secret-voting contents corresponding to the voting affair from a voter using the smart mobile communication device after the voter uses the secret voting certificate to execute a digital signature through the client module; and the server module calculating statistics of the secret voting contents received from the smart mobile communication device and publishing the results.

7. The voting method of claim 6, further comprising saving voter information, verifying registration, and verifying identity through the voter management module; and wherein the voter management module comprises an identity verification module, a binding module, and an information saving module; wherein the voter information saving process is as follows: the information saving module saves the voter information as received by the server from the smart mobile communication device; the registration verification process is as follows: after the voter submits the voter information to the server module, the identity verification module verifies, by one or more processors, the correctness of the voter information and sends, by one or more processors, the verified results to the binding module; when the correctness verification is passed, the binding module binds, by one or more processors, the voter information one-to-one with a number of the smart mobile communication device; otherwise, no binding takes place; the identity verification process is as follows: when the voter passes the correctness verification and is bound to the smart mobile communication device number, the identity verification module verifies, by one or more processors, the validity of the voter's identity; otherwise, no identity verification takes place.

8. The voting method of claim 7, wherein creating the secret voting certificate further includes:

a certificate requesting step: the voter through the client module and following the secret voting affair creates the private key and a public key, and encrypts and saves them; the voter then sends a request for the secret voting certificate which is encrypted by the public key to the certificate management module;

a certificate obtaining step: the certificate management module receives, by one or more processors, the request, creates, by one or more processors, a first random verification code, and then sends, by one or more processors, the first random verification code through the binding smart mobile communication device number obtained from the voter management module to the voter; the voter then sends the first random verification code which the voter received back to the certificate management module;

a verification requesting step: the certificate management module verifies, by one or more processors, whether the first random verification code that the voter sends is the same as the first random verification code that is saved, verifies, by one or more processors, through the voting affair management module whether the voter meets the voting eligibility of the secret voting, and verifies, by one or more processors, whether the voter has previously requested a secret voting certificate; when all of the following conditions are satisfied: consistent first random verification code, eligible to vote, and no previous request for secret voting certificate, then the certificate management module allows, by one or more processors, the request, sends, by one or more processors, an issuing instruction to the PKI/CA module, and proceeds, by one or more processors, to the request forming step; otherwise, the request is rejected and the secret voting certificate creation process is terminated;

a request package forming step: the certificate name, purpose, valid voting period, a request for signature and the request for the secret voting certificate are serialized, by one or more processors, to create the voting certificate request package which is then saved and sent to the PKI/CA module;

a certificate issuing step: the PKI/CA module uses, by one or more processors, the private key to decrypt the voting certificate request package, and then verifies, by one or more processors, the completeness and legitimacy of the decrypted voting certificate request package; if it is complete and legitimate, the PKI/CA module creates, by one or more processors, the secret voting certificate and saves it; and a certificate downloading step: the voter through the client module checks at a given time whether the certificate issuing step is complete; if it is complete, the client module automatically downloads, by one or more processors, the secret voting certificate; otherwise, downloading does not take place.

9. The voting method of claim 8, wherein after the voter uses the secret voting certificate to execute the digital signature through the client module, the voter submits the secret voting contents of the secret voting affair to the server module; the server module calculates, by one or more processors, the statistics of the secret voting contents and publishes, by one or more processors, the results; the above process is achieved through the voting affair management module; and wherein the voting affair management module comprises a secret voting creation module, a secret voting module, and a secret vote counting module; wherein the procedure is as follows:

submitting step: the voter uses the secret voting certificate to execute a digital signature for the secret voting affair created in the secret voting creation module, encrypts the secret voting contents and then sends them to the secret voting module;

verification step: the secret voting module receives, by one or more processors, the secret voting contents, verifies, by one or more processors, whether the secret voting is within the valid voting period, through the PKI/CA, verifies, by one or more processors, whether the secret voting certificate is legitimate, verifies, by one or more processors, whether the secret voting certificate and the secret voting affair correspond with each other, and verifies, by one or more processors, whether the verification data is complete; when all conditions, validity, legitimacy, correspondence, and completeness of the data, are met, the secret voting module saves, by one or more processors, the secret voting contents and proceeds, by one or more processors, to the vote counting step; otherwise, the secret voting contents are not saved and the calculation and publication of the statistics of the secret voting contents will not continue;

vote counting step: the secret vote counting module uses, by one or more processors, the private key to decrypt the secret voting contents, through the PKI/CA module, verifies, by one or more processors, whether the secret voting certificate is legitimate, verifies, by one or more processors, whether the secret voting certificate corresponds with the secret voting affair, verifies, by one or more processors, whether the secret voting contents are complete, and verifies, by one or more processors, whether the voting process is legitimate; when all of the conditions are met, i.e., the secret voting certificate is legitimate and corresponds with the secret voting affair, the secret voting contents are complete, and the voting process is legitimate, then the secret voting contents go through the statistics calculation and publication; otherwise, the statistics calculation and publication do not take place.

10. The voting method of claim 9, wherein the voting method further comprises a vote verification procedure by which the voter verifies the secret voting contents the voter submitted; wherein the voting management module further comprises a secret vote verification module; the verification procedure is achieved through the secret vote verification module, the procedure of which is as follows:

requesting step: the voter submits a verification request to the secret vote verification module of the secret voting affair;

searching step: the secret vote verification module performs, by one or more processors, the search according to the secret voting affair and the voter information for the corresponding secret voting contents; if found, the procedure proceeds to the verification step; otherwise, a prompt appears indicating that the corresponding secret voting contents are not found and the procedure does not proceed to the verification step;

verification step: the server module verifies, by one or more processors, whether the secret voting contents are complete and whether the voter's public key corresponds with the public key of the secret voting certificate; when the secret voting contents are complete and the public keys correspond with each other, a prompt appears indicating that the vote verification succeeds appears; otherwise, the prompt indicates that the verification fails.

11. A voting method involving a smart mobile communication device and a server, the smart mobile communication device having a client module previously downloaded by a user of the smart mobile communication device, and the server having a server module, the smart mobile communication device and server being in communication via a mobile communication network, the voting method being performed by one or more processors of the smart mobile communication device and server, comprising:

creating and publishing a secret voting affair, the secret voting affair being created and published by a secret voting affair creation module of a voting affair management module of the server module;

the server receiving a secret voting certificate request package from the smart mobile communication device, wherein the secret voting certificate request package is created by the client module and includes serialized certificate information and a public key of a pair of asymmetric encrypted keys;

the server module of the server temporarily saving the secret voting certificate request package in a disk file along with a plurality of other secret voting certificate request packages until a predetermined threshold number of certificate request packages is accumulated;

once the predetermined threshold number of certificate request packages is accumulated, the server module releasing the secret voting certificate request package and the other secret voting certificate request packages to a PKI/CA module of the server module in a second sequence that differs from a first sequence in which the secret voting certificate request package and the other secret voting certificate request packages were received by the server and saved in the disk file;

the server module creating a unique secret voting certificate based on the secret voting certificate request package;

the server module issuing the unique secret voting certificate to the smart mobile communication device from the server along with other unique secret voting certificates based on the other secret voting certificate request packages to other respective smart mobile communication devices on the mobile communication network so that a sequence of certificate issuance corresponds with the second sequence; and the server receiving voting contents of the voting affair from the voter after the voter uses the unique secret voting certificate to execute a digital signature through the client module.

* * * * *